(12) United States Patent
Danielsen

(10) Patent No.: US 6,270,142 B1
(45) Date of Patent: Aug. 7, 2001

(54) MOTORCYCLE WINDSHIELD WIPER

(76) Inventor: Jay D. Danielsen, N2331 Highway 22, Waupaca, WI (US) 54981

(*) Notice: Subject to any disclaimer, the term of this patent is extended or adjusted under 35 U.S.C. 154(b) by 0 days.

(21) Appl. No.: 09/414,210

(22) Filed: Oct. 8, 1999

(51) Int. Cl.$^7$ .................................................. B60J 1/02
(52) U.S. Cl. .................................... 296/96.17; 296/78.1
(58) Field of Search ............................ 296/78.1, 96.17

(56) References Cited

U.S. PATENT DOCUMENTS

| | | | |
|---|---|---|---|
| 4,019,774 | * 4/1977 | Tsukahara et al. | 296/78.1 |
| 4,066,291 | * 1/1978 | Hickman | 296/78.1 |
| 4,226,463 | * 10/1980 | Gager | 296/78.1 |
| 4,355,838 | * 10/1982 | Hickman | 296/78.1 |
| 4,439,886 | * 4/1984 | Yagasaki et al. | 296/78.1 |
| 4,514,006 | * 4/1985 | Maruoka | 296/78.1 |
| 4,529,242 | * 7/1985 | Watanabe et al. | 296/78.1 |
| 4,606,571 | * 8/1986 | Fujita | 296/78.1 |
| 5,658,035 | * 8/1997 | Armstrong | 296/78.1 |
| 5,836,042 | * 11/1998 | Funk et al. | 296/96.17 |
| 5,845,955 | * 12/1998 | Willey | 296/78.1 |
| 5,853,217 | * 12/1998 | Armstrong | 296/78.1 |
| 5,878,631 | * 3/1999 | Muchlpforte et al. | 296/96.17 |
| 5,997,070 | * 12/1999 | Matsuo et al. | 296/78.1 |
| 6,042,171 | * 3/2000 | Hesse | 296/78.1 |
| 6,120,083 | * 9/2000 | Gunther | 296/78.1 |

* cited by examiner

Primary Examiner—Joseph D. Pape
Assistant Examiner—Kiran B. Patel
(74) Attorney, Agent, or Firm—Donald Cayen

(57) ABSTRACT

A wiper for a motorcycle windshield is mounted by using the structural members that attach the windshield to the front wheel assembly, namely, generally horizontal windshield bars that sandwich the windshield between them. A threaded tube of an electric motor passes through concentric holes in the windshield bars and in the windshield. A nut threaded on a motor tube clamps the windshield bars and the windshield between the nut and the motor. A fastener passes through a motor tab and second concentric holes in the bars and windshield to resist the motor torque during operation. The windshield wiper can be factory installed. Alternately, its simplicity lends itself to retrofitting existing motorcycles.

3 Claims, 3 Drawing Sheets

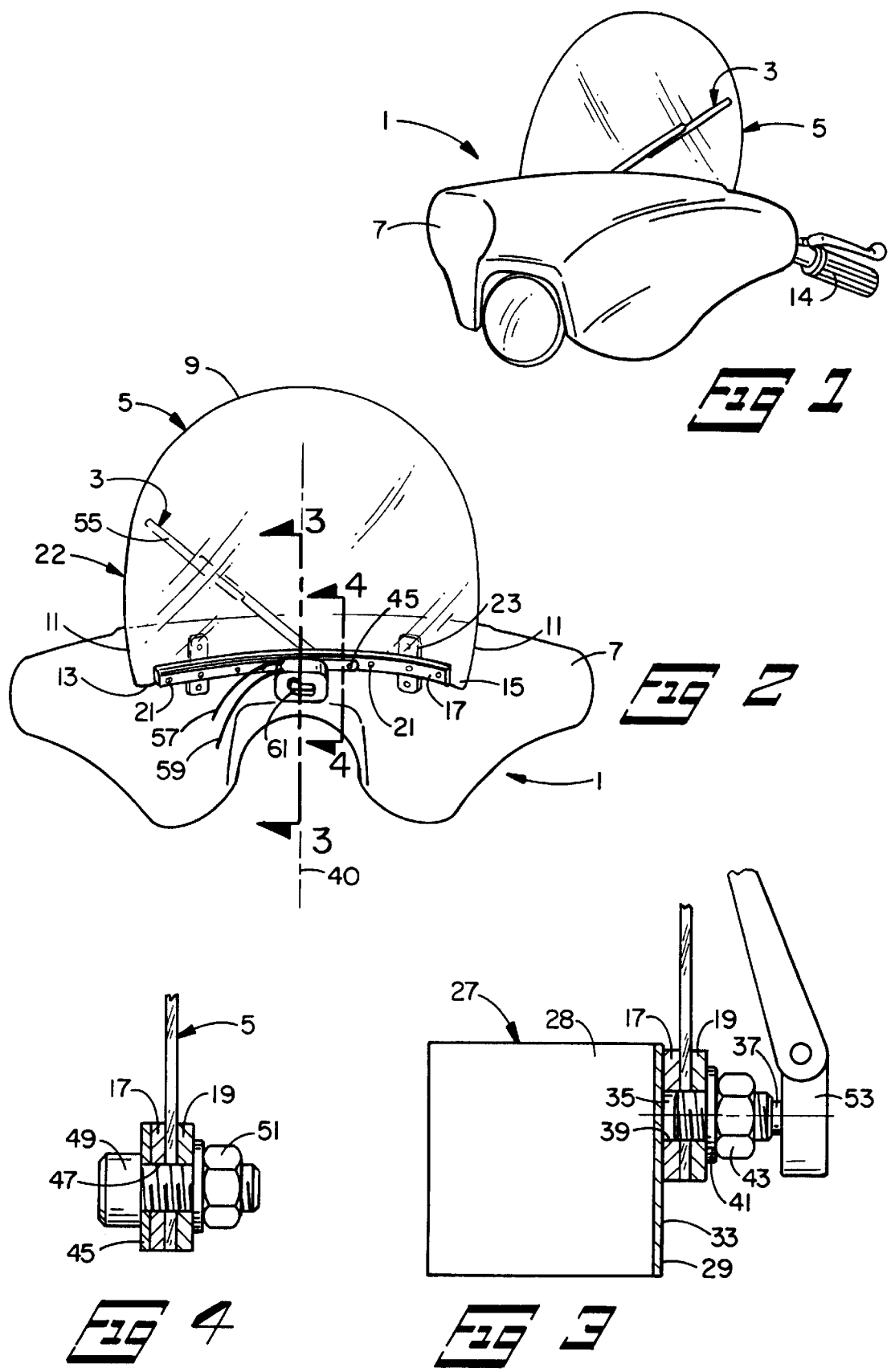

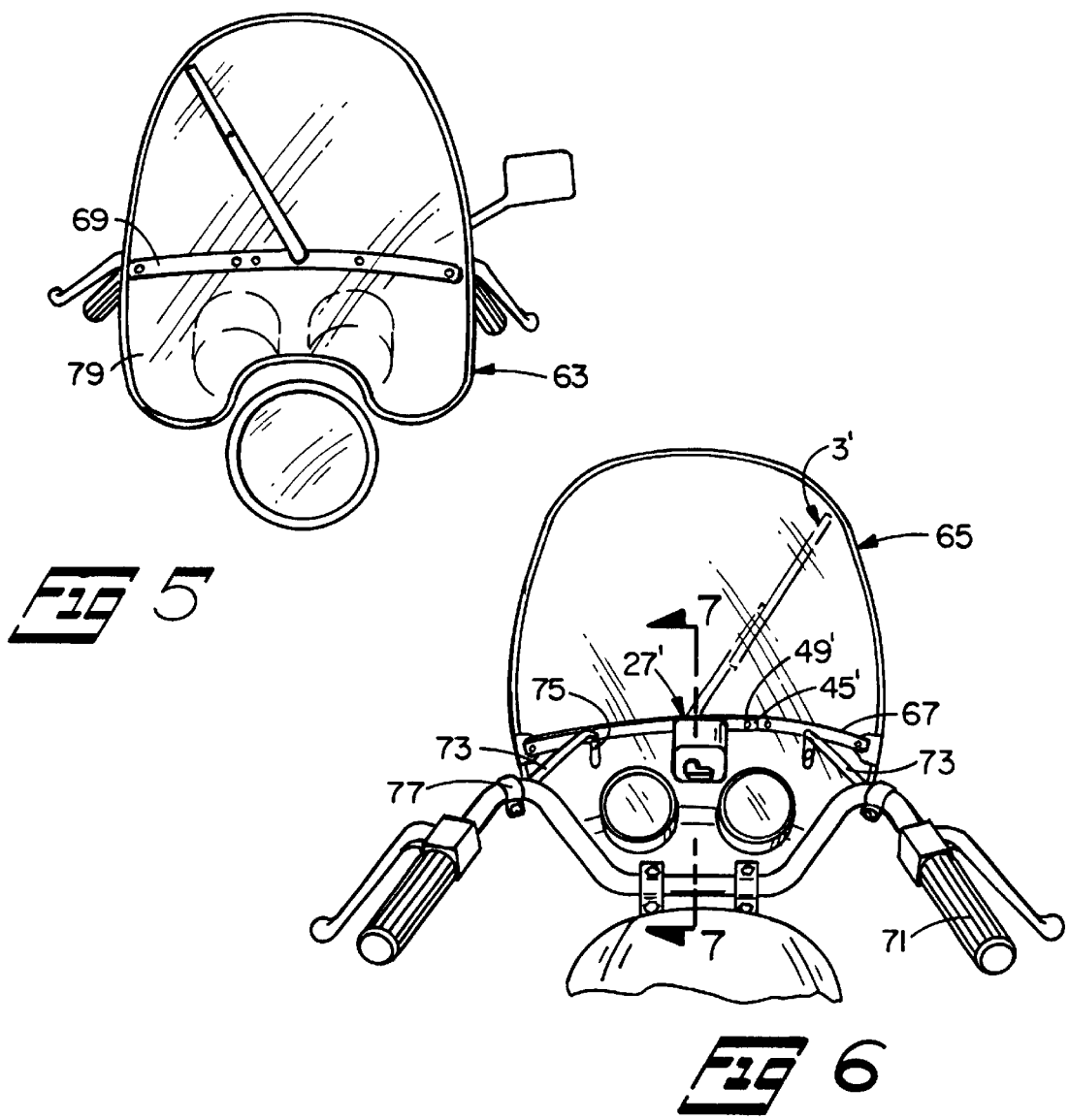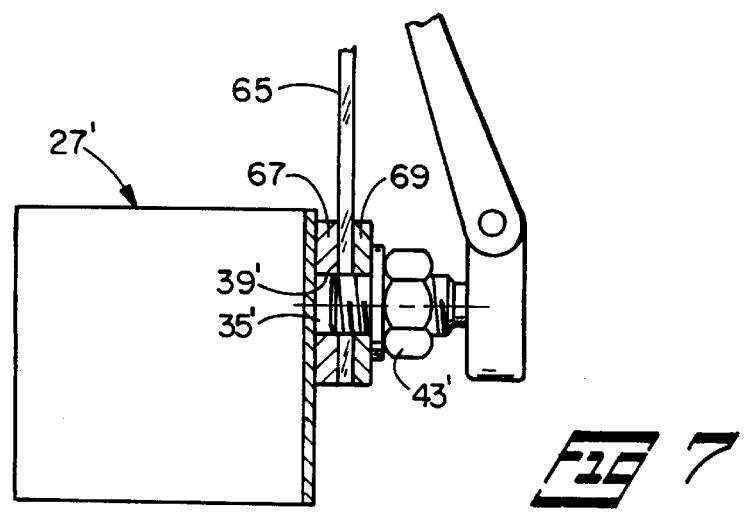

MOTORCYCLE WINDSHIELD WIPER

BACKGROUND OF THE INVENTION

1. Field of the Invention

This invention pertains to motor vehicle safety, and more particularly to apparatus that improves the vision of motorcycle drivers.

2. Description of the Prior Art

It is well known to equip four-wheel motor vehicles with electric wipers for their windshields. Even four-wheel vehicles that lack an enclosed interior for the driver, such as military jeeps, routinely include windshields and wipers.

On the other hand, commercial motorcycles and offroad vehicles are usually not manufactured with wipers for their windshields. The lack of windshield wipers has long been a problem for riders of commercially available motorcycles. In wet weather, water both as raindrops and splash from the pavement strikes the windshield and distorts the driver's vision. Consequently, wet weather adds a dimension of danger to riding motorcycles and similar vehicles.

However, wipers for motorcycle windshields are not unknown. U.S. Pat. Nos. 4,066,291; 4,355,838; and 4,439,886 show motorcycles with windshield wipers. As shown in the U.S. Pat. No. 4,355,838, the wiper motor is mounted directly to the windshield. That design imposes a stress on the windshield that may tend to crack it. The mounting structures for the wipers of the U.S. Pat. Nos. 4,066,291 and 4,439,886 are quite complicated and expensive. In general, the benefits obtained from the prior motorcycle windshield wipers were outweighed by their disadvantages. As a result, windshield wipers have rarely been used on motorcycles.

Thus, a need exists for an improved motorcycle windshield wiper.

SUMMARY OF THE INVENTION

In accordance with the present invention, a simple wiper is provided that is easily installed on the windshields of commercial motorcycles and similar vehicles. This is accomplished by apparatus that utilizes structural components of existing windshields.

The windshield may have any of a variety of shapes. A common characteristic of the windshields is that they are unsupported for the majority of their peripheries. In most designs, the upper portion is generally ovular. The lower portion may be concealed by a fairing, or the lower portion may be exposed. In either case, the windshield is held to the motorcycle by being sandwiched between two horizontal windshield bars. In turn, the windshield bars are attached to the front wheel assembly of the motorcycle.

The windshield wiper of the invention has a motor that is mounted to the windshield bars. For that purpose, there are concentric holes through both bars and through the windshield. The motor case has a mounting surface in contact with the inside windshield bar. A motor tube extends through the holes and past the outside windshield bar. A nut threaded onto the motor tube and tightened against the outside windshield bar secures the motor. The motor armature protrudes past the tube in a manner that enables a wiper arm to be assembled to the armature.

To aid in resisting the torque produced on the motor case during operation, the motor case has a tab projecting from it. The tab is in facing contact with the inside windshield bar when the motor is mounted. A fastener passes through the tab and through second concentric holes in the two windshield bars and the windshield.

The windshield motor is powered via wires from an electrical source on the motorcycle. When the motor is mechanically and electrically assembled, it operates to clear the windshield of water and road splash.

The windshield wiper can be assembled at the time of manufacture as original equipment. Alternately, the windshield wiper can be purchased as a kit by the owner and retrofitted to his motorcycle.

The method and apparatus of the invention, using existing structural components to mount a windshield wiper, thus greatly improves the safety of a person riding a motorcycle in the rain. The windshield wiper can be furnished as original equipment by the manufacturer, even though it is equally suitable for the aftermarket.

Other advantages, benefits, and features of the present invention will become apparent to those skilled in the art upon reading the detailed description of the invention.

BRIEF DESCRIPTION OF THE DRAWINGS

FIG. 1 is a perspective view of the front wheel fairing and windshield of a typical motorcycle that includes the present invention.

FIG. 2 is a back view of the windshield wiper of the invention mounted to the motorcycle of FIG. 1.

FIG. 3 is a cross sectional view on an enlarged scale taken along line 3—3 of FIG. 2.

FIG. 4 is a cross sectional view on an enlarged scale taken along line 4—4 of FIG. 2.

FIG. 5 is a front view of the windshield wiper of the invention mounted on another motorcycle.

FIG. 6 is a back view of the windshield wiper mounted on the motorcycle of FIG. 5.

FIG. 7 is a cross sectional view on an enlarged scale taken along line 7—7 of FIG. 6.

DETAILED DESCRIPTION OF THE PREFERRED EMBODIMENT

Figure 8:
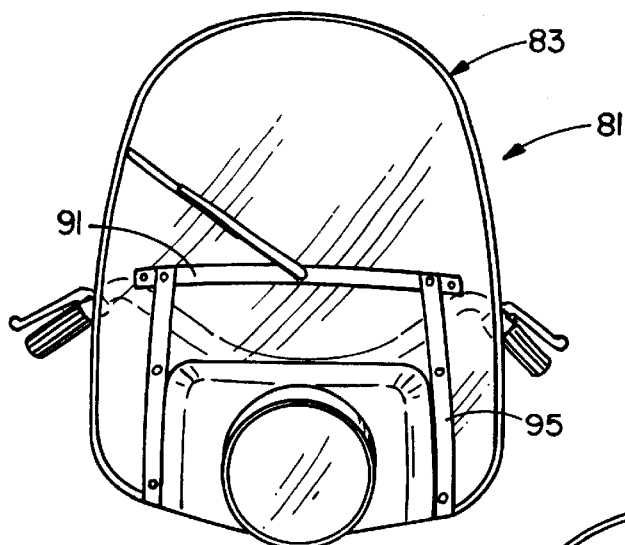
FIG. 8 is a front view of the windshield wiper of the invention mounted on still another motorcycle.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 2, a partial view of a typical motorcycle 1 is illustrated that includes the windshield wiper 3 of the present invention. It will be understood, however, that the windshield wiper 3 is not limited to use with motorcycles. Rather, the invention can be used with equal effectiveness on all motor vehicles in which the driver is not enclosed in an interior, such as snowmobiles and all-terrain vehicles. Such vehicles are characterized by windshields that are unsupported for much of their peripheries. In the motorcycle 1, for example, the windshield 5 is supported only along a narrow portion 15 adjacent a lower edge 13. The windshield lower edge 13 is behind a fairing 7 and in front of the motorcycle handle bars 14, all of which are on the motorcycle front wheel assembly.

Looking also at FIGS. 3 and 4, the windshield 5 of the motorcycle 1 has a curved top edge 9 that blends into parallel side edges 11. A straight bottom edge 13 extends between the side edges 11. The portion 15 of the windshield along the bottom edge 13 is sandwiched between two generally horizontal windshield bars 17 and 19. The bar 17 will be considered the inside bar, and the bar 19 will be considered the outside bar. The windshield bars are approximately in horizontal alignment with the handle bars 14. Rivets or other fasteners 21 are used to hold the windshield and bars together in a unitary assembly 22. Small plates or brackets 23 that are part of the outside bar 19 are used to attach the windshield and bar assembly 22 to the motorcycle front wheel assembly, not shown, but not to the fairing 7.

In accordance with the present invention, the windshield and bar assembly 22 further includes the windshield wiper 3. The windshield wiper is comprised of an electric motor 27 having a case 28 with a flange 29. A suitable motor is Model 89FR2871W marketed by the J.C. Whitney Company. There is a mounting surface 33 on the flange 29. A threaded tube 35 is fixed to the flange concentric with the motor armature 37. There are concentric holes, collectively represented at reference numeral 39, through the bars 17 and 19 and the windshield 5. The holes 39 are preferably but not necessarily along a central longitudinal centerline 40 of the motorcycle 1. The motor is mounted to the windshield and bar assembly by inserting the motor tube 35 through the holes 39. A washer 41 is placed over the tube 35. A nut 43 is threaded onto the tube and tightened to draw the motor mounting surface 33 against the inside bar 17. Simultaneously, the washer 41 bears against the outside bar 19. The motor and nut 43 thus cooperate to tightly clamp the windshield and the two windshield bars between them and thereby mount the motor without jeopardy to the windshield.

To resist the torque of the motor case 28 during operation, the motor flange 29 has a tab 45 with a hole through it. A bolt 49 passes through the tab hole and through concentric holes 47 in the inside and outside bars 17 and 19, respectively, and through the windshield 5. A washer and nut 51 threaded on the bolt 49 bear against the outside bar 19 and complete the motor mounting.

One wire 57 leads from the motor 27 to a source of electrical power on the motorcycle 1. A second wire 59 leads from the motor to a ground. For example, the wire 59 may be held under and in electrical contact with the bolt 49.

A wiper arm 53 is pressed onto the armature 37 of the motor 27. The distal end of the wiper arm 53 receives a wiper blade 55 that is sized for the particular windshield 5. A knob 61 turns the motor on and off.

Further in accordance with the present invention, the windshield wiper is not limited to use with motorcycles in which the windshield is sandwiched along its lower edge. Turning to FIGS. 5–7, a motorcycle 63 lacks a faring. The windshield 65 of the motorcycle 63 has a bottom portion 79 that is located in general horizontal alignment with the region in which a fairing would normally be located. That is, the windshield bottom portion 79 is located substantially below the handle bars 71. The windshield is sandwiched between inside and outside windshield bars 67 and 69, respectively, that are in approximate horizontal alignment with the handle bars 71. Bent rods 73 hold the inside windshield bar 67 to the handle bars 71 by means of posts 75 that are fixed to the inside windshield bar. Second ends of the rods 73 are clamped to the handle bars with clamps 77.

The mounting of a windshield wiper 3' to the motorcycle 63 of FIGS. 5–7 is substantially the same as for mounting the windshield 3 to the motorcycle 1 of FIGS. 1–4. That is, the windshield wiper 3' utilizes the structural strength of the windshield bars 67 and 69, thus avoiding the imposition of any stress on the windshield 65 itself. The motor 27' is mounted by a threaded tube 35' thereon that passes through concentric holes 39' in the two windshield bars and the windshield. The motor 27' is secured with a nut 43'. The motor 27' has a tab 45' that is secured to the windshield bars and windshield by a bolt and nut 49'.

Figure 9:
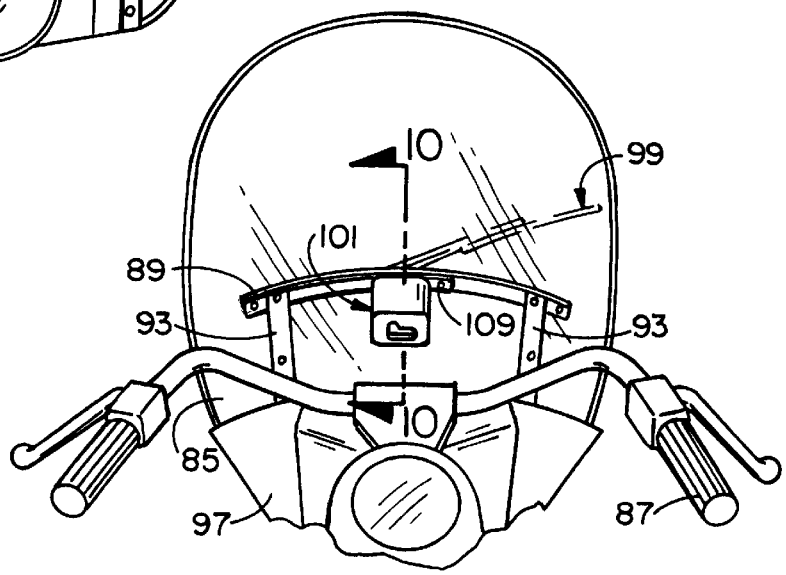
FIG. 9 is a back view of the windshield wiper mounted on the motorcycle of FIG. 8.
Figure 10:
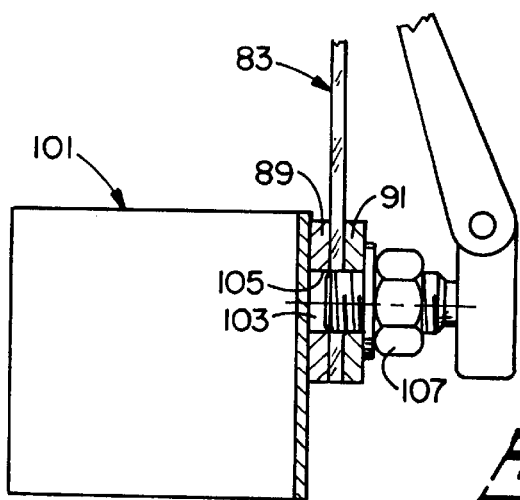
FIG. 10 is a cross sectional view on an enlarged scale taken along line 10—10 of FIG. 9.

The versatility of the invention is further demonstrated in regard to FIGS. 8–10. The motorcycle 81 does not have a fairing. The windshield 83 has a lower portion 85 that is below the general level of the handle bars 87. The windshield 83 is held in place between a pair of horizontal windshield bars 89 and 91, and between two pairs of vertical windshield bars 93 and 95. The vertical windshield bars 93 and 95 are attached to a plate 97 that is part of the motorcycle front wheel assembly.

The windshield wiper 99 of the invention comprises a motor 101 with a threaded tube 103 that passes through concentric holes 105 in the windshield bars 89 and 91 and in the windshield 83. A nut 107 and fastener 109 secure the motor 101 to the windshield bars and windshield. The operation of the windshield wiper 99 is substantially the same as that of the windshield wipers 3 and 3' of FIGS. 1–4 and 5–7, respectively.

In summary, the results and advantages of windshields on motorcycles can now be more fully realized. The windshield wiper of the invention provides both safety for the motorcycle driver as well as a stress-free mounting to the windshield. This desirable result comes from using the combined functions of the horizontal windshield bars that are pre-existing components of the motorcycle. The windshield bars hold the windshield to the motorcycle. In addition, the windshield bars support the windshield wiper such that no stress is imposed on the windshield itself. The windshield wiper can be part of the original equipment of the motorcycle as installed at the factory. Alternately, the simple design of the windshield wiper lends it to easy installation by a motorcycle owner after purchase. The windshield wiper is sufficiently versatile to fit many makes and models of motorcycles, whether or not they have fairings.

It will also be recognized that in addition to the superior performance of the windshield wiper, its construction is such as to be of modest cost in comparison to the benefits it provides. In addition, since the windshield wiper is of a simple design and is mounted to existing motorcycle structural components, it will give long service life without detrimental effect to the motorcycle windshield.

Thus, it is apparent that there has been provided, in accordance with the invention, a motorcycle windshield wiper that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In a motorcycle having a front wheel assembly and being of a type in which a windshield having first and second faces is unsupported along top and side edges thereof, first and second elongated generally horizontal windshield bars each having a predetermined width and being in flat facing contact with the first and second windshield faces, respectively, and immovably sandwiching the windshield therebetween; means for attaching the first and second horizontal windshield bars to the front wheel assembly; a windshield wiper comprising an electric motor having a mounting surface in facing contact with the first horizontal windshield bar, a threaded tube that extends through first concentric holes in the first and second horizontal windshield bars and in the windshield, and an armature that protrudes from the threaded tube; a first nut threaded on the threaded tube and bearing against the second horizontal windshield bar such that tightening the first nut on the threaded tube draws the motor mounting surface against the first horizontal windshield bar and draws the nut against the second horizontal windshield bar and immovably clamps the windshield between the first and second horizontal windshield bars and immovably clamps the windshield and first and second horizontal windshield bars between the motor mounting surface and the first nut to thereby mount the motor to the motorcycle front wheel assembly; and a wiper arm and blade pressed onto the motor armature.

2. The motorcycle of claim 1 wherein the means for attaching the first and second horizontal windshield bars to the front wheel assembly comprises multiple pairs of first and second generally vertical windshield bars immovably sandwiching the windshield therebetween, each vertical windshield bar having first and second ends, and a width dimension substantially greater than a thickness dimension, the first ends of the first and second vertical windshield bars overlapping the full width of the first and second horizontal windshield bars and being connected to the first and second horizontal windshield bars, the second ends of the first and second vertical windshield bars being connected to the front wheel assembly.

3. The motorcycle of claim 1 wherein:
  a. the motor includes a tab having a hole therethrough; and
  b. a fastener passes through the hole in the motor tab and through second concentric holes in the first and second horizontal windshield bars and in the windshield to clamp the first and second horizontal windshield bars and the windshield between the motor tab and the fastener and thereby provide a resistance to torque produced by the motor.

* * * * *